(12) United States Patent  
Nishino (10) Patent No.: US 8,190,023 B2  
(45) Date of Patent: May 29, 2012

(54) OPTICAL COMMUNICATION DEVICE, OPTICAL COMMUNICATION SYSTEM, OPTICAL OUTPUT CONTROL METHOD AND PROGRAM

(75) Inventor: Masaru Nishino, Tokyo (JP)

(73) Assignee: NEC Corporation, Tokyo (JP)

( * ) Notice: Subject to any disclaimer, the term of this patent is extended or adjusted under 35 U.S.C. 154(b) by 492 days.

(21) Appl. No.: 12/511,432

(22) Filed: Jul. 29, 2009

(65) Prior Publication Data

US 2010/0028004 A1    Feb. 4, 2010

(30) Foreign Application Priority Data

Aug. 1, 2008  (JP) ............................... P2008-199625

(51) Int. Cl.  
*H04B 10/00* (2006.01)

(52) U.S. Cl. ............ 398/15; 398/59; 398/113; 398/140; 398/173; 398/177

(58) Field of Classification Search .................... 398/15, 398/59, 113, 140, 173, 177  
See application file for complete search history.

(56) References Cited

U.S. PATENT DOCUMENTS

| | | | |
|---|---|---|---|
| 4,435,850 A | 3/1984 | Bowen et al. | |
| 5,073,982 A | 12/1991 | Viola et al. | |
| 5,161,044 A | 11/1992 | Nazarathy et al. | |
| 5,515,361 A * | 5/1996 | Li et al. ........................ | 370/222 |
| 6,188,494 B1 * | 2/2001 | Minteer ....................... | 398/135 |
| 6,194,707 B1 * | 2/2001 | Yang ........................ | 250/227.15 |
| 6,243,195 B1 * | 6/2001 | Pedersen et al. .................. | 398/9 |
| 6,356,367 B1 * | 3/2002 | DeCusatis et al. ................ | 398/5 |
| 6,359,708 B1 * | 3/2002 | Goel et al. ....................... | 398/15 |
| 6,359,709 B1 * | 3/2002 | DeCusatis et al. ................ | 398/5 |
| 6,504,630 B1 * | 1/2003 | Czarnocha et al. ............. | 398/15 |
| 6,850,360 B1 * | 2/2005 | Chen et al. .................... | 359/334 |
| 6,937,820 B2 * | 8/2005 | Iwaki et al. ...................... | 398/6 |
| 7,002,734 B2 * | 2/2006 | Horachi et al. ............. | 359/341.4 |
| 7,039,313 B2 * | 5/2006 | Casanova et al. ............... | 398/18 |
| 7,085,496 B2 * | 8/2006 | Kinoshita et al. ............... | 398/83 |
| 7,092,630 B2 * | 8/2006 | Cunningham et al. .......... | 398/15 |
| 7,218,442 B2 * | 5/2007 | Akbaba et al. ................ | 359/334 |
| 7,260,324 B2 * | 8/2007 | Passier et al. ................... | 398/17 |
| 7,336,901 B1 * | 2/2008 | Soulliere ........................ | 398/94 |
| 7,430,373 B2 * | 9/2008 | Yamashita ...................... | 398/83 |
| 7,519,300 B2 * | 4/2009 | Ohtani et al. ................ | 398/177 |

(Continued)

FOREIGN PATENT DOCUMENTS

JP       2000332695 A    11/2000

(Continued)

OTHER PUBLICATIONS

Russian Decision on Grant for RU2009129368/09(040866) issued Dec. 27, 2010.

(Continued)

*Primary Examiner* — Agustin Bello (57) ABSTRACT

An input of a command to stop optical output or a command to reduce optical output by a main signal transmitting section is received from the outside. When the input of the optical output stop command or optical output reduction command is received, an inter-device control signal communication section transmits the optical output stop command or optical output reduction command. Based on the input optical output stop command or optical output reduction command, an output of optical signals from the main signal transmitting section is stopped, or else the output level is reduced to less than the output level during normal operation.

14 Claims, 8 Drawing Sheets

U.S. PATENT DOCUMENTS

| | | | |
|---|---|---|---|
| 7,551,857 B2 * | 6/2009 | Fukushi et al. | 398/177 |
| 7,574,132 B2 * | 8/2009 | Stilling | 398/1 |
| 7,630,644 B2 * | 12/2009 | Yamamoto et al. | 398/83 |
| 7,729,613 B2 * | 6/2010 | Lauder | 398/15 |
| 7,773,884 B2 * | 8/2010 | Ghera et al. | 398/92 |
| 7,787,767 B2 * | 8/2010 | Wang | 398/33 |
| 7,792,430 B2 * | 9/2010 | Deguchi et al. | 398/157 |
| 7,864,389 B2 * | 1/2011 | Muzicant | 359/33 |
| 7,912,369 B2 * | 3/2011 | Kokkinos | 398/15 |
| 7,917,030 B2 * | 3/2011 | BuAbbud et al. | 398/37 |
| 7,957,643 B2 * | 6/2011 | Feldman et al. | 398/30 |
| 8,036,538 B2 * | 10/2011 | Wang et al. | 398/181 |
| 8,045,851 B2 * | 10/2011 | Lu et al. | 398/6 |
| 8,068,735 B2 * | 11/2011 | Stango et al. | 398/79 |
| 2002/0027690 A1 * | 3/2002 | Bartur et al. | 359/152 |
| 2004/0136720 A1 * | 7/2004 | Mahowald et al. | 398/135 |
| 2006/0013583 A1 * | 1/2006 | Fukushi et al. | 398/18 |
| 2007/0098411 A1 * | 5/2007 | Ghera et al. | 398/177 |
| 2009/0142061 A1 * | 6/2009 | BuAbbud et al. | 398/79 |

FOREIGN PATENT DOCUMENTS

| | | |
|---|---|---|
| JP | 2004297790 A | 10/2004 |
| RU | 2101867 C1 | 10/1996 |
| RU | 2237367 C2 | 9/2004 |

OTHER PUBLICATIONS

Russian Office Action for RU2009129368/09(040866) issued June 4, 2010.

* cited by examiner

OPTICAL COMMUNICATION DEVICE, OPTICAL COMMUNICATION SYSTEM, OPTICAL OUTPUT CONTROL METHOD AND PROGRAM

This application is based upon and claims priority to Japanese Patent Application No. 2008-199625, filed Aug. 1, 2008, the content of which is incorporated herein in its entirety by reference.

BACKGROUND OF THE INVENTION

1. Field of the Invention

The present invention relates to an optical communication device which uses high output light such as wavelength division multiplexers and optical cross-connect devices, and to an optical output control method, an optical communication system, and a program thereof.

2. Description of Related Art

When maintenance is being carried out on an optical communication system, connections between optical fiber cables and optical communication devices such as wavelength division multiplexers are cut. The optical output level from an optical communication device is extremely high, and if an optical fiber connection is cut without this optical output being stopped or decreased, there is a possibility of damage occurring such as a connector end surface catching fire because of contamination or the like, or such as the maintenance operator suffering harmful physical effects. Because of this, by inputting a command to shut down the optical communication device, the optical output in the segment where maintenance work is to be performed is stopped prior to this maintenance work being started, and the maintenance work is only started after the optical output has been stopped.

In Japanese Unexamined Patent Application, First Publications, Nos. 2000-332695 and 2004-297790, there is disclosed a method of stopping or decreasing optical output by activating an APR (Auto Power Reduction) function with which the optical communication device is provided when a failure occurs.

Because an optical communication device performs communication mutually with other optical communication devices, in order to stop optical output in a maintenance segment it is necessary to shut down the plurality of optical communication devices which are connected to the maintenance segment. When optical output is stopped by shutting down each optical communication device in this manner, it is necessary to verify which optical communication devices have to be shut down in order for optical output to be stopped in the maintenance segment. However, because the respective optical communication devices are normally installed at remote distances, it is not possible to visually confirm those optical communication devices which are connected to the maintenance segment. Because of this, the connection state is read from a network connection diagram or the like, and shutdown is then performed for the appropriate optical communication devices. At this time, there is a possibility that optical communication devices which should not be shut down will be shut down due to the network connection diagram being misinterpreted or to an incorrect operation or the like.

If an optical communication device which should not be shut down is shut down, then because communication is also stopped outside the maintenance segment, this creates considerable impediments to the providing of a service. Furthermore, because the optical output is not stopped in the maintenance segment, the problem arises that it is not possible to guarantee the safety of maintenance operators.

Moreover, because the methods described in Japanese Unexamined Patent Application, First Publications, Nos. 2000-332695 and 2004-297790 are both methods in which a fault is detected and then an APR function is put into operation, other than when a fault occurs it has not hitherto been possible to either stop or reduce the optical output in order to perform a maintenance operation such as, for example, when connections need to be altered in an optical fiber cable because of modifications to the transmission route.

The present invention was conceived in view of the above described points, and it is an object thereof to provide an optical communication device which makes it possible to either stop or reduce an optical output in a segment where a maintenance operation is to be performed irrespective of whether or not a fault has occurred therein, and to consequently avoid any risk of operational errors occurring which might result from this stopping or reducing of the optical output.

SUMMARY

The present invention seeks to solve one or more of the above problems, or to improve upon those problems at least in part.

In one embodiment, there is provided an optical communication device which transmits and receives optical signals via an optical fiber cable, that includes at least: a transmitting unit which transmits optical signals to another optical communication device; a receiving unit which receives optical signals from the other optical communication device; a command input unit which receives an input of either an optical output stop command or an optical output reduction command for the transmitting unit from the outside; a command transmitting unit which, when the optical output stop command is input, executes processing to transmit the optical output stop command to the other optical communication device via the transmitting unit, or when the optical output reduction command is input, executes processing to transmit the optical output reduction command to the other optical communication device via the transmitting unit; a command executing unit which, when the optical output stop command is input, executes processing to stop the output of optical signals from the transmitting unit, or when the optical output reduction command is input, executes processing to reduce the output level of optical signals from the transmitting unit to less than the output level used during normal operations; and a transition completion notification unit which, when an optical signal received by the receiving unit from the other optical communication device has stopped or when the input level of the optical signal has been reduced to less than the input level used during normal operations, outputs a maintenance state transition completion notification.

In the optical communication device, the command input unit may receive the input of an optical output restart command for the transmitting unit from the outside, the command executing unit, when the optical output restart command is input, may raise the output level of optical signals from the transmitting unit to the output level used during normal operations, the command transmitting unit, when the optical output restart command is input, may transmit the optical output restart command to the other optical communication device via the transmitting unit, and the transition completion notification unit, when the input level of optical signals received by the receiving unit from the other optical communication device has been raised to the input level used during normal operations, may output an operating state transition completion notification.

In another embodiment, there is provided an optical communication device which transmits and receives optical signals via an optical fiber cable, that includes at least: a transmitting unit which transmits optical signals to another optical communication device; a receiving unit which receives an optical output stop command or an optical output reduction command from the other optical communication device; and a command executing unit which, when the optical output stop command is input, executes processing to stop the output of optical signals from the transmitting unit, or when the optical output reduction command is input, executes processing to reduce the output level of optical signals from the transmitting unit to less than the output level used during normal operations.

In the optical communication device, the receiving unit may receive an optical output restart command from the other optical communication device, and the command executing unit, when the optical output restart command is input, may raise the output level of optical signals from the transmitting unit to the output level used during normal operations.

Moreover, the optical communication device may further comprise: an excitation light output unit which outputs excitation light which is used for Raman amplification via the optical fiber cable connected to the receiving unit; and an excitation light output stopping unit which, when an optical signal amplified by the excitation light is no longer being input, or when the input level of the optical signal has been reduced to less than the input level used during normal operations, stops the output of the excitation light output unit via the receiving unit.

Besides, the optical communication device may further comprise an excitation light output restarting unit which, when the optical output restart command is input, restarts the output of the excitation light by the excitation light output unit.

In another embodiment, there is provided an optical communication system, that includes at least: a first optical communication device and a second optical communication device which transmit and receive optical signals via an optical fiber cable, wherein the first optical communication device comprises: a transmitting unit which transmits optical signals to the second optical communication device; a receiving unit which receives optical signals from the second optical communication device; a command input unit which receives an input of either an optical output stop command or an optical output reduction command for its own transmitting unit from the outside; a command transmitting unit which, when the optical output stop command is input, executes processing to transmit the optical output stop command to the second optical communication device via its own transmitting unit, or when the optical output reduction command is input, executes processing to transmit the optical output reduction command to the second optical communication device via its own transmitting unit; a command executing unit which, when the optical output stop command is input, executes processing to stop the output of optical signals from its own transmitting unit, or when the optical output reduction command is input, executes processing to reduce the output level of optical signals from its own transmitting unit to less than the output level used during normal operations; and a transition completion notification unit which, when an optical signal received by its own receiving unit from the second optical communication device has stopped or when the input level of the optical signal has been reduced to less than the input level used during normal operations, outputs a maintenance state transition completion notification, and wherein the second optical communication device comprises: a transmitting unit which transmits optical signals to the first optical communication device; a receiving unit which receives an optical output stop command or an optical output reduction command from the first optical communication device; and a command executing unit which, when the optical output stop command is input, executes processing to stop the output of optical signals from its own transmitting unit, or when the optical output reduction command is input, executes processing to reduce the output level of optical signals from its own transmitting unit to less than the output level used during normal operations.

In the optical communication system, the command input unit of the first optical communication device may receive the input of an optical output restart command for its own transmitting unit from the outside, the command executing unit of the first optical communication device, when the optical output restart command is input, may raise the output level of optical signals from its own transmitting unit to the output level used during normal operations, the command transmitting unit of the first optical communication device, when the optical output restart command is input, may transmit the optical output restart command to the second optical communication device via its own transmitting unit, the transition completion notification unit of the first optical communication device, when the input level of optical signals received by its own receiving unit from the second optical communication device has been raised to the input level used during normal operations, may output an operating state transition completion notification, the receiving unit of the second optical communication device may receive an optical output restart command from the first optical communication device, and the command executing unit of the second optical communication device, when the optical output restart command is input, may raise the output level of optical signals from its own transmitting unit to the output level used during normal operations.

In still another embodiment, there is provided an optical output control method for an optical communication system which comprises a first optical communication device and a second optical communication device which transmit and receive optical signals via an optical fiber cable, that includes at least: first transmitting in which a transmitting unit of the first optical communication device transmits optical signals to the second optical communication device; first receiving in which a receiving unit of the first optical communication device receives optical signals from the second optical communication device; command inputting in which a command input unit of the first optical communication device receives an input of either an optical output stop command or an optical output reduction command for its own transmitting unit from the outside; command transmitting in which a command transmitting unit of the first optical communication device, when the optical output stop command is input, executes processing to transmit the optical output stop command to the second optical communication device via its own transmitting unit, or when the optical output reduction command is input, executes processing to transmit the optical output reduction command to the second optical communication device via its own transmitting unit; first command executing in which a command executing unit of the first optical communication device, when the optical output stop command is input, executes processing to stop the output of optical signals from its own transmitting unit, or when the optical output reduction command is input, executes processing to reduce the output level of optical signals from its own transmitting unit to less than the output level used during normal operations; transition completion notifying in which a transition completion notification unit of the first optical communication device, when an optical signal received by its own receiving unit from the second optical communication device has stopped or when the input level of the optical signal has been reduced to less than the input level used during normal operations, outputs a maintenance state transition completion notification; second transmitting in which a transmitting unit of the second optical communication device transmits optical signals to the first optical communication device; second receiving in which a receiving unit of the second optical communication device receives an optical output stop command or an optical output reduction command from the first optical communication device; and second command executing in which a command executing unit of the second optical communication device, when the optical output stop command is input, executes processing to stop the output of optical signals from its own transmitting unit, or when the optical output reduction command is input, executes processing to reduce the output level of optical signals from its own transmitting unit to less than the output level used during normal operations.

In the optical output control method, the command input unit of the first optical communication device may receive the input of an optical output restart command for its own transmitting unit from the outside, the command executing unit of the first optical communication device, when the optical output restart command is input, may raise the output level of optical signals from its own transmitting unit to the output level used during normal operations, the command transmitting unit of the first optical communication device, when the optical output restart command is input, may transmit the optical output restart command to the second optical communication device via its own transmitting unit, the transition completion notification unit of the first optical communication device, when the input level of optical signals received by its own receiving unit from the second optical communication device has been raised to the input level used during normal operations, may output an operating state transition completion notification, the receiving unit of the second optical communication device may receive an optical output restart command from the first optical communication device, and the command executing unit of the second optical communication device, when the optical output restart command is input, may raise the output level of optical signals from its own transmitting unit to the output level used during normal operations.

In still another embodiment, there is provided a program which causes a computer of an optical communication device which transmits optical signals via an optical fiber cable to function: as a transmitting unit which transmits optical signals to another optical communication device; as a command input unit which receives an input of either an optical output stop command or an optical output reduction command for the transmitting unit from the outside; as a command transmitting unit which, when the optical output stop command is input, executes processing to transmit the optical output stop command to the other optical communication device via the transmitting unit, or when the optical output reduction command is input, executes processing to transmit the optical output reduction command to the other optical communication device via the transmitting unit; as a command executing unit which, when the optical output stop command is input, executes processing to stop the output of optical signals from the transmitting unit, or when the optical output reduction command is input, executes processing to reduce the output level of optical signals from the transmitting unit to less than the output level used during normal operations; and as a transition completion notification unit which, when an optical signal received by the receiving unit from the other optical communication device has stopped or when the input level of the optical signal has been reduced to less than the input level used during normal operations, outputs a maintenance state transition completion notification.

Moreover, the program may further cause the computer to function: as a command input unit which receives the input of an optical output restart command for the transmitting unit from the outside; as a command executing unit which, when the optical output restart command is input, raises the output level of optical signals from the transmitting unit to the output level used during normal operations; as a command transmitting unit which, when the optical output restart command is input, transmits the optical output restart command via the transmitting unit; and as a transition completion notification unit which, when the input level of optical signals received by the receiving unit from the other optical communication device has been raised to the input level used during normal operations, outputs an operating state transition completion notification.

In still another embodiment, there is provided a program which causes a computer of an optical communication device which transmits and receives optical signals via an optical fiber cable to function: as a transmitting unit which transmits optical signals to another optical communication device; as a receiving unit which receives an optical output stop command or an optical output reduction command from the other optical communication device; and as a command executing unit which, when the optical output stop command is input, executes processing to stop the output of optical signals from the transmitting unit, or when the optical output reduction command is input, executes processing to reduce the output level of optical signals from the transmitting unit to less than the output level used during normal operations.

Still more, the program may further cause the computer to function: as a receiving unit which receives an optical output restart command via the optical fiber cable; and as a command executing unit which, when the optical output restart command is input, raises the output level of optical signals from the transmitting unit to the output level used during normal operations.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

First Embodiment

A first embodiment of the present invention will now be described in detail with reference made to the drawings.

Figure 1:
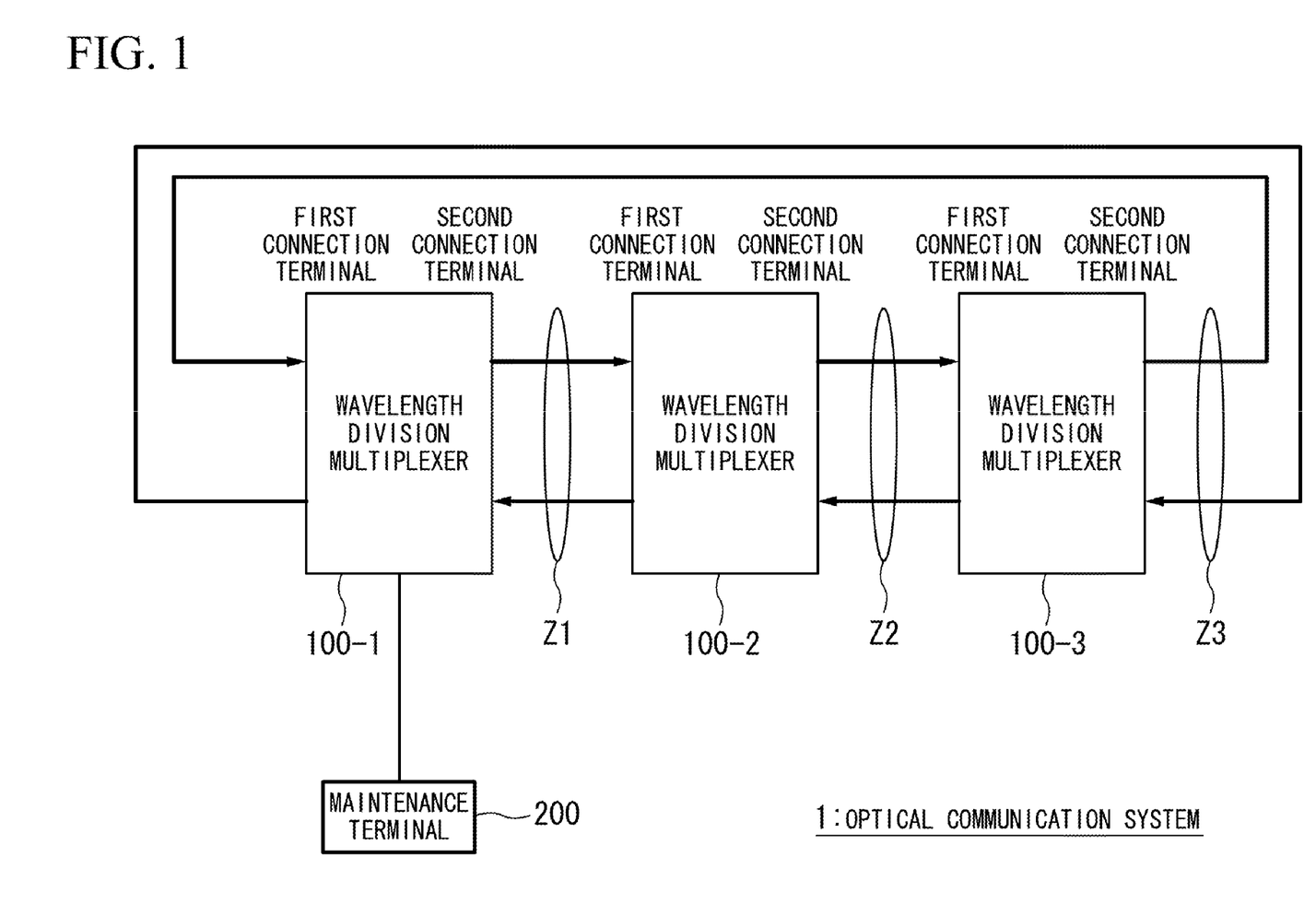
FIG. 1 is a schematic block diagram showing the structure of an optical communication system according to a first embodiment of the present invention.

FIG. 1 is a schematic block diagram showing the structure of an optical communication system according to the first embodiment of the present invention.

The optical communication system shown in FIG. 1 shows an example in which three wavelength division multiplexers (i.e., optical communication devices) are connected in sequence so as to construct a ring-shaped optical communication system whose nodes are formed by these wavelength division multiplexers. An optical communication system 1 is provided with wavelength division multiplexers 100-1 through 100-3 and with a maintenance terminal 200. The wavelength division multiplexers 100-1 through 100-3 each have a first connection terminal and a second connection terminal. The second connection terminal of the wavelength division multiplexer 100-1 is connected to the first connection terminal of the wavelength division multiplexer 100-2 in a segment Z1. The second connection terminal of the wavelength division multiplexer 100-2 is connected to the first connection terminal of the wavelength division multiplexer 100-3 in a segment Z2. The second connection terminal of the wavelength division multiplexer 100-3 is connected to the first connection terminal of the wavelength division multiplexer 100-1 in a segment Z3. The wavelength division multiplexers 100-1 through 100-3 perform the transmitting and receiving of optical signals with other wavelength division multiplexers which are connected to them. The maintenance terminal 200 is connected to any one of the wavelength division multiplexers 100-1 through 100-3 at one end of the maintenance segment, and transmits control signals (i.e., an optical output stop command, an optical output reduction command, or an optical output restart command) to the wavelength division multiplexers.

Figure 2:
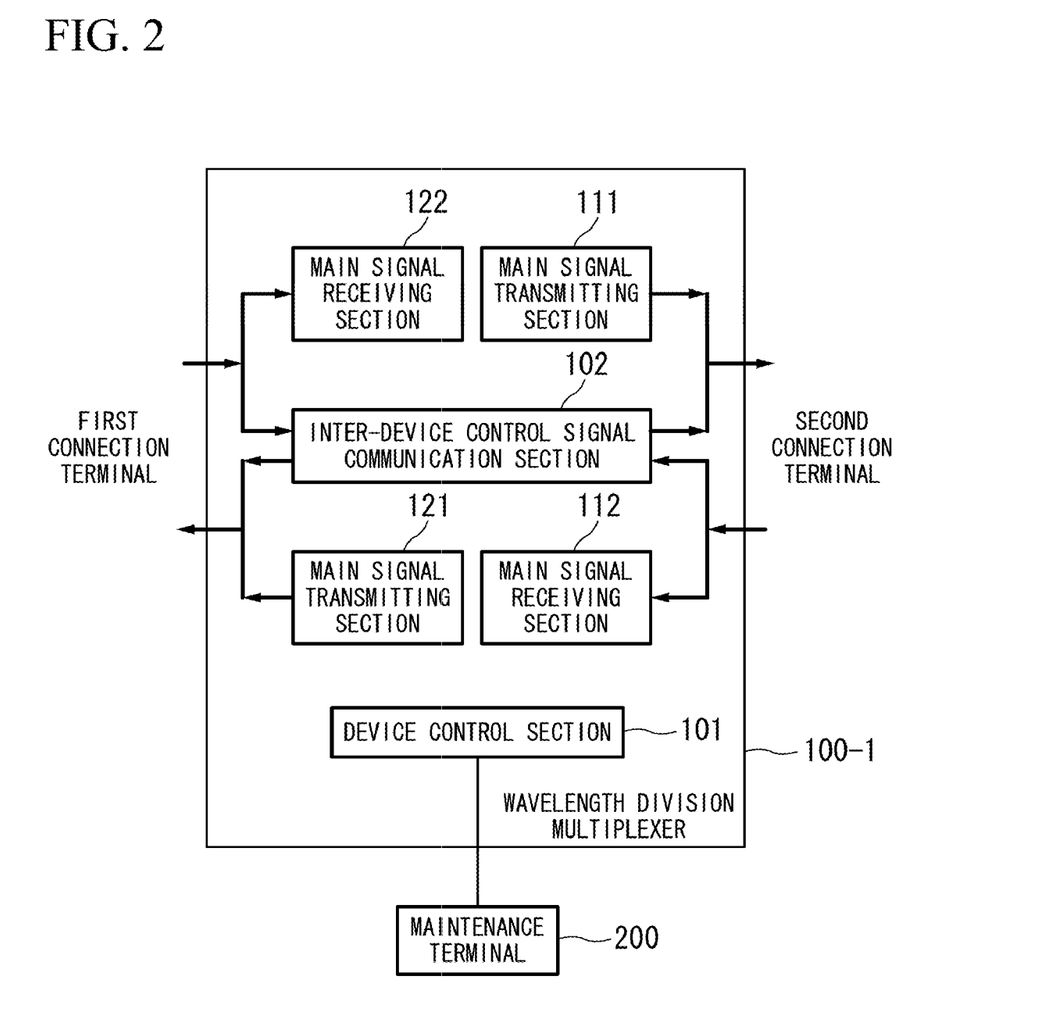
FIG. 2 is a schematic block diagram showing the structure of a wavelength division multiplexer.

FIG. 2 is a schematic block diagram showing the structure of a wavelength division multiplexer.

The wavelength division multiplexer 100-1 is provided with a device control section 101 (command input unit, command transmitting unit, command executing unit), an inter-device control signal communication section 102 (transmitting unit, receiving unit), main signal transmitting sections 111 and 121 (transmitting units), and main signal receiving sections 112 and 122 (receiving units). The device control section 101 has a connecting section which connects with the maintenance terminal 200 and receives control signals input from the maintenance terminal 200. Based on input control signals, the device control section 101 controls optical outputs from the main signal transmitting sections 111 or 121 using an APR function, and announces control signal transmission commands to the inter-device control signal communication section 102. The inter-device control signal communication section 102 performs the transmitting and receiving of control signals with the wavelength division multiplexers 100-1 through 100-3 which are connected to it. The main signal transmitting section 111 outputs optical signals to a wavelength division multiplexer which is connected to the second connection terminal thereof. The main signal receiving section 112 receives optical signals from the wavelength division multiplexer which is connected to the second connection terminal thereof. The main signal transmitting section 121 outputs optical signals to the wavelength division multiplexer which is connected to the first connection terminal thereof. The main signal receiving section 122 receives optical signals from the wavelength division multiplexer which is connected to the first connection terminal thereof.

The structure and functions of the wavelength division multiplexers 100-2 and 100-3 are the same as those of the wavelength division multiplexer 100-1.

A description of an operation to stop optical output in a maintenance segment of this optical communication system will now be described.

Here, an example is used in which the segment Z1 is taken as the maintenance segment, and a maintenance operator is located at the installation position of the wavelength division multiplexer 100-1.

Figure 3:
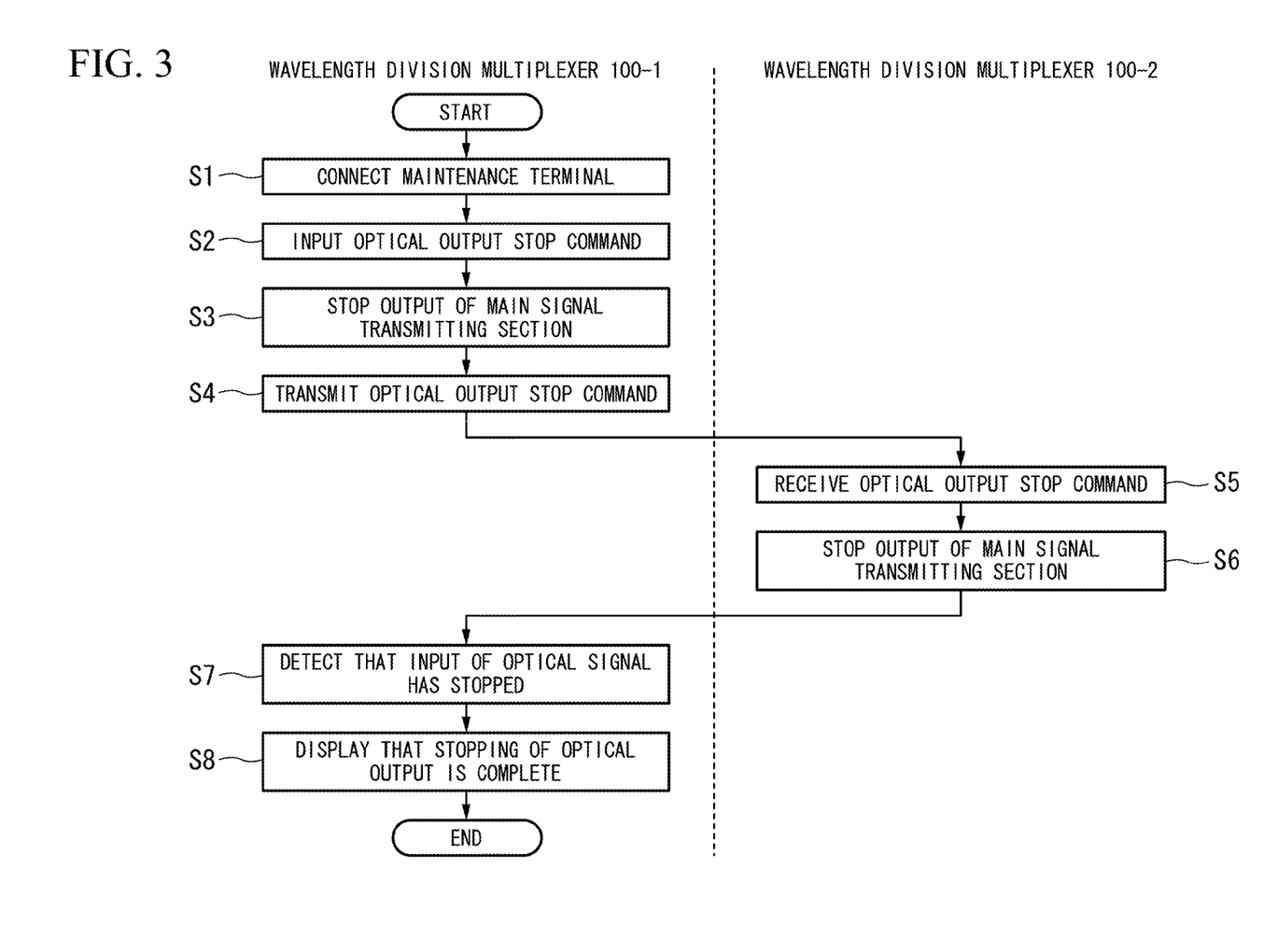
FIG. 3 is a flowchart showing an operation to stop an optical output in a segment Z1.

FIG. 3 is a flow chart showing an operation to stop an optical output in the segment Z1.

Firstly, as a result of the maintenance operator connecting the maintenance terminal 200 to the wavelength division multiplexer 100-1 (a first optical communication device), the device control section 101 of the wavelength division multiplexer 100-1 detects the connection of the maintenance terminal 200 (step S1). When the maintenance terminal 200 is connected, the maintenance operator inputs a command to stop the optical output from the second connection terminal of the wavelength division multiplexer 100-1 by operating an input section (not shown) of the maintenance terminal 200. When the maintenance terminal 200 receives the input of this optical output stop command, it outputs an optical output stop command for the second connection terminal to the device control section 101 of the wavelength division multiplexer 100-1 (step S2). When the device control section 101 receives the input of the optical output stop command, it activates an APR function in the main signal transmitting section 111, and stops the optical output (step S3). When the device control section 101 acquires the optical output stop command in step S2, it transmits an optical output stop command to the wavelength division multiplexer 100-2 (a second optical communication device) via the inter-device control signal communication section 102 (step S4).

The inter-device control signal communication section 102 of the wavelength division multiplexer 100-2 receives the optical output stop command which was sent in step S4 (step S5). The inter-device control signal communication section 102 of the wavelength division multiplexer 100-2 notifies the device control section of the wavelength division multiplexer 100-2 about the received optical output command. The device control section 101 of the wavelength division multiplexer 100-2 acquires the optical output stop command from the inter-device control signal communication section 102. The device control section 101 activates an APR function in the main signal transmitting section 121 which is connected to the wavelength division multiplexer 100-1 which is the source of the optical output stop command transmission, and thus stops this optical output (step S6).

The main signal receiving section 112 of the wavelength division multiplexer 100-1 detects the fact that the input of the optical signal from the wavelength division multiplexer 100-2 has stopped (step S7). When it detects that the input of the optical signal has stopped, the device control section 101 displays the fact that the stopping of the optical output in the segment Z1 has been completed (i.e., a maintenance state transition completion notification) on a display section (not shown) of the maintenance terminal 200 (step S8).

In this manner, by connecting the maintenance terminal 200 to the wavelength division multiplexer 100-1 and inputting a command to stop an optical output, it is possible to stop the optical outputs of both the wavelength division multiplexer 100-1 and the wavelength division multiplexer 100-2. The maintenance operator is able to secure their safety and prevent accidents by not commencing the maintenance work until the fact that the stopping of the optical output in the segment Z1 has been completed is displayed on the display section of the maintenance terminal 200.

Note that, here, an example is used in which the segment Z1 is taken as the maintenance segment, and the maintenance operator connects the maintenance terminal 200 to the wavelength division multiplexer 100-1, however, connecting the maintenance terminal 200 to the wavelength division multiplexer 100-2 and using the segments Z2 and Z3 as maintenance segments can be achieved by performing the same processing.

Note also that, here, an operation to stop an optical output is described, however, an operation to reduce an optical output can be achieved by performing the same processing. If an optical output is to be reduced, then the input control information is a command to reduce optical output instead of being a command to stop optical output. As a result of this, the wavelength division multiplexers 100-1 through 100-3 reduce the output level of optical signals to less than the output level which is used during normal operations.

Next, a description will be given of an operation to restart the optical output in the maintenance segment of the optical communication system once a maintenance task has been completed.

Here, as is described above, an example is described in which the segment Z1 is taken as the maintenance segment and a maintenance operator is located at the installation position of the wavelength division multiplexer 100-1.

Figure 4:
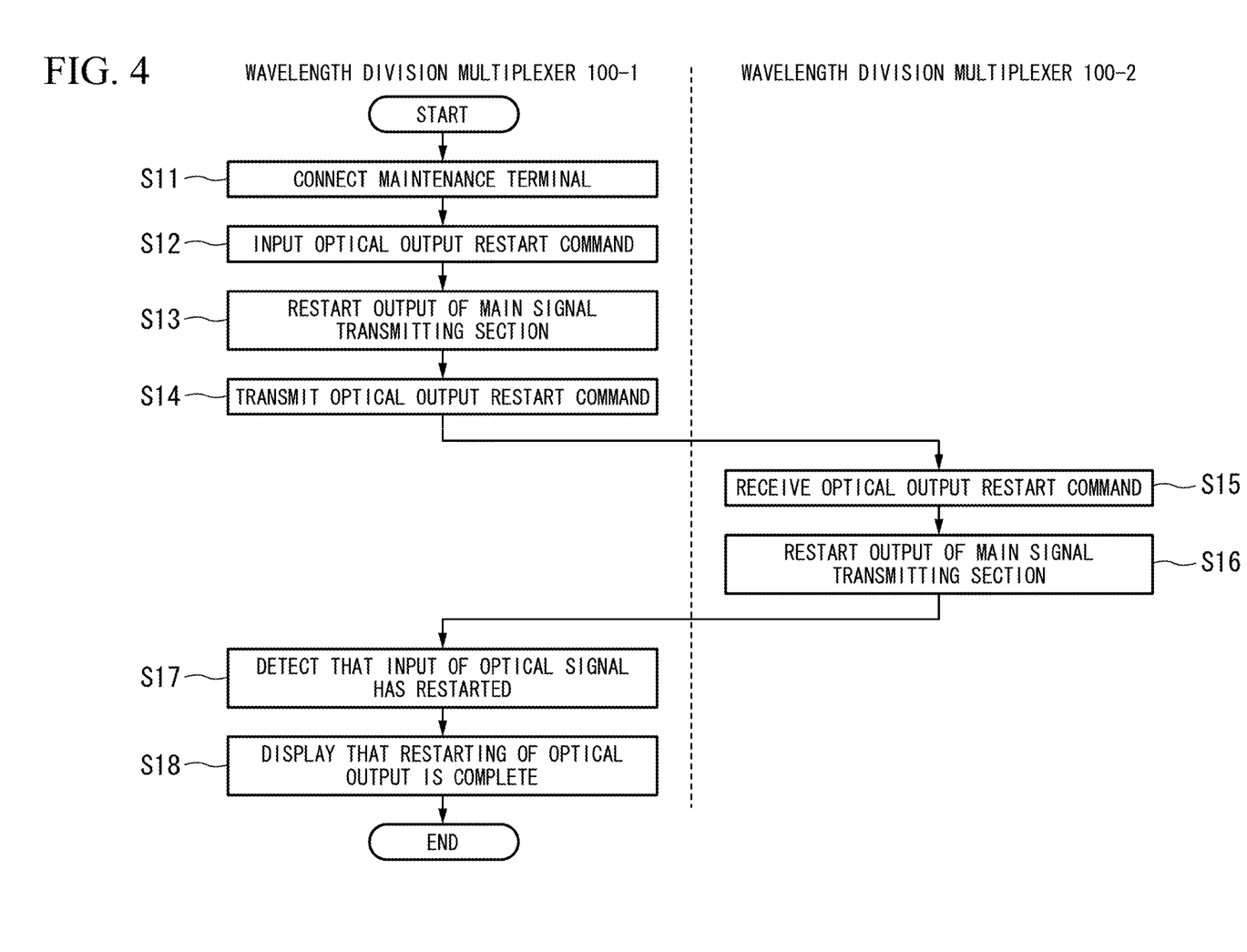
FIG. 4 is a flowchart showing an operation to restart an optical output in a segment Z1.

FIG. 4 is a flowchart showing an operation to restart an optical output in the segment Z1.

Firstly, as a result of the maintenance operator connecting the maintenance terminal 200 to the wavelength division multiplexer 100-1, the device control section 101 of the wavelength division multiplexer 100-1 detects the connection of the maintenance terminal 200 (step S11). When the maintenance terminal 200 is connected, the maintenance operator operates the input section (not shown) of the maintenance terminal 200 so as to input a command to restart the optical output from the second connection terminal of the wavelength division multiplexer 100-1. When the maintenance terminal 200 receives the input of the optical output restart command, it outputs the optical output restart command for the second connection terminal to the device control section 101 of the wavelength division multiplexer 100-1 (step S12). When the device control section 101 receives the input of the optical output restart command, it activates an APR function in the main signal transmitting section 111, and thus restarts the optical output (step S13). Here, 'restart' refers to lifting the output level to the output level used during normal operations. When the device control section 101 acquires the optical output restart command in step S12, it transmits the optical output restart command to the wavelength division multiplexer 100-2 via the inter-device control signal communication section 102 (step S14).

The inter-device control signal communication section 102 of the wavelength division multiplexer 100-2 receives the optical output restart command which was transmitted in step S14 (step S15). The inter-device control signal communication section 102 of the wavelength division multiplexer 100-2 notifies the device control section 101 of the wavelength division multiplexer 100-2 that it has received the optical output restart command. The device control section 101 of the wavelength division multiplexer 100-2 acquires the optical output restart command from the inter-device control signal communication section 102. The device control section 101 then activates an APR function in the main signal transmitting section 121 which is connected to the wavelength division multiplexer 100-1 which is the source of the optical output restart command transmission, and thus causes the optical output to be restarted (step S16).

The main signal receiving section 112 of the wavelength division multiplexer 100-1 detects the fact that the input of the optical signal from the wavelength division multiplexer 100-2 has restarted (step S17). When it detects that the input of the optical signal has restarted, the device control section 101 displays the fact that the restarting of the optical output in the segment Z1 has been completed (i.e., an operating state transition completion notification) on a display section (not shown) of the maintenance terminal 200 (step S18).

In this manner, by connecting the maintenance terminal 200 to the wavelength division multiplexer 100-1 and inputting a command to restart an optical output, it is possible to restart the optical outputs of both the wavelength division multiplexer 100-1 and the wavelength division multiplexer 100-2. The maintenance operator is able to confirm that communication has restarted in the segment Z1 as the fact that the restarting of the optical output in the segment Z1 has been completed is displayed on the display section of the maintenance terminal 200.

Note that, here, an example is used in which the segment Z1 is taken as the maintenance segment, and the maintenance operator connects the maintenance terminal 200 to the wavelength division multiplexer 100-1, however, connecting the maintenance terminal 200 to the wavelength division multiplexer 100-2 and using the segments Z2 and Z3 as maintenance segments can be achieved by performing the same processing.

In this manner, according to the first embodiment, by inputting an optical output stop command or an optical output reduction command into one optical communication device in a maintenance segment, this optical communication device stops or reduces its own optical output from itself. Furthermore, it also sends the optical output stop command or optical output reduction command to optical communication devices in the maintenance segment which are connected to itself, thereby causing the optical output from these optical communication devices in the maintenance segment to be stopped or reduced. As a result, although, conventionally, it has been necessary to input a shutdown command to each one of a plurality of optical communication devices in a maintenance segment, because it is only necessary to input an optical output stop command or an optical output reduction command into a single optical communication device, there is no possibility that optical communication devices which should not be shut down will end up being shut down by mistake. Moreover, because it is possible to stop or reduce optical output by inputting an optical output stop command or an optical output reduction command, it is possible to stop or reduce the optical output in a maintenance segment irrespective of whether or not a fault has occurred.

Second Embodiment

Next, a second embodiment of the present invention will be described. In the second embodiment, an example is given of optical output control in an optical communication system which employs a Raman amplification excitation light source.

Figure 5:
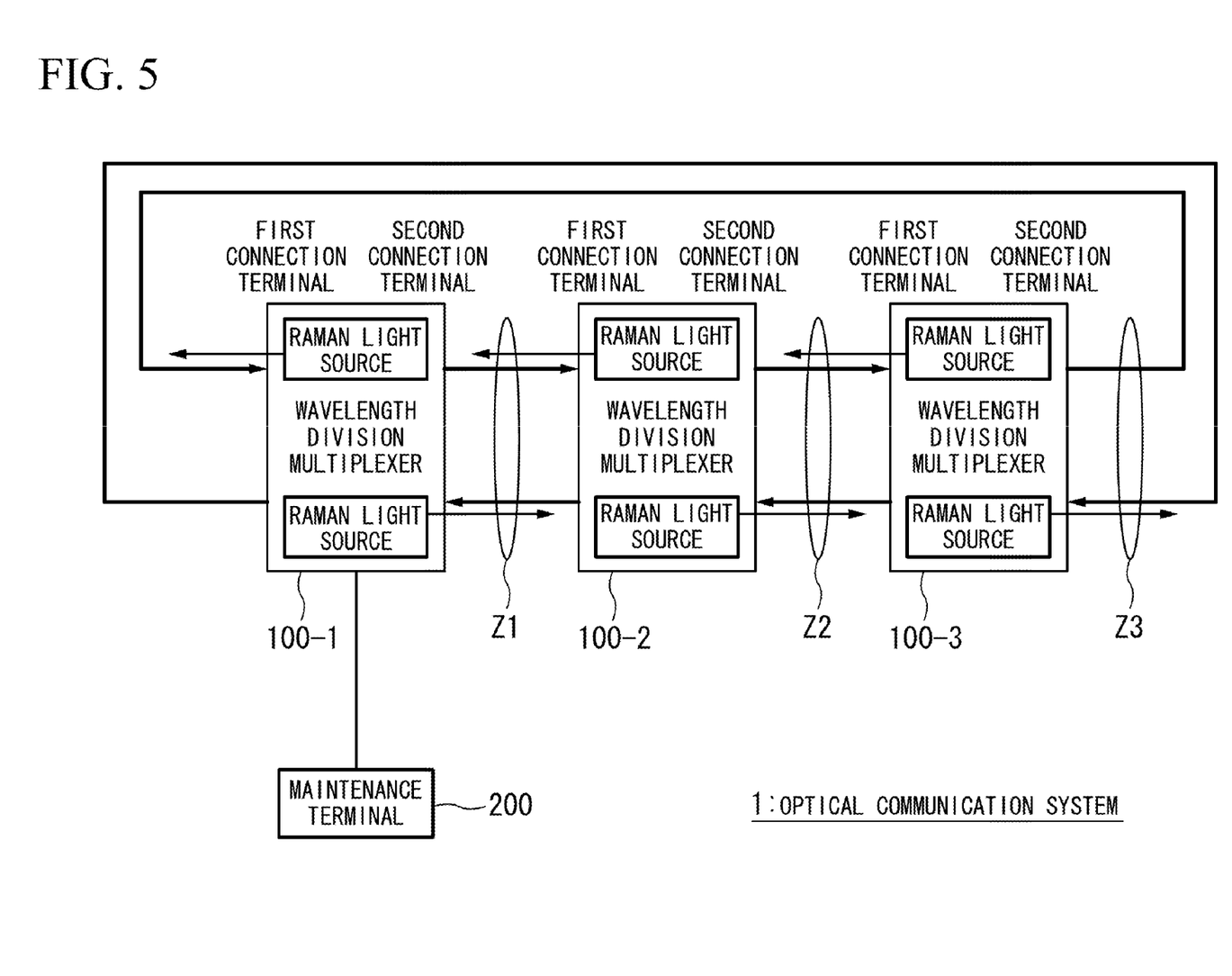
FIG. 5 is a schematic block diagram showing the structure of an optical communication system according to a second embodiment of the present invention.

FIG. 5 is a schematic block diagram showing the structure of an optical communication system according to the second embodiment of the present invention.

The wavelength division multiplexers 100-1 through 100-3 of the optical communication system 1 according to the second embodiment are each provided with Raman light sources which are connected to an optical fiber cable on the receiving side of each wavelength division multiplexer, and output excitation light in the opposite direction from received signals. Excluding the fact that they are provided with Raman light sources, because the rest of the structure is the same as in the optical communication system of the first embodiment, the same symbols are used in the description.

Figure 6:
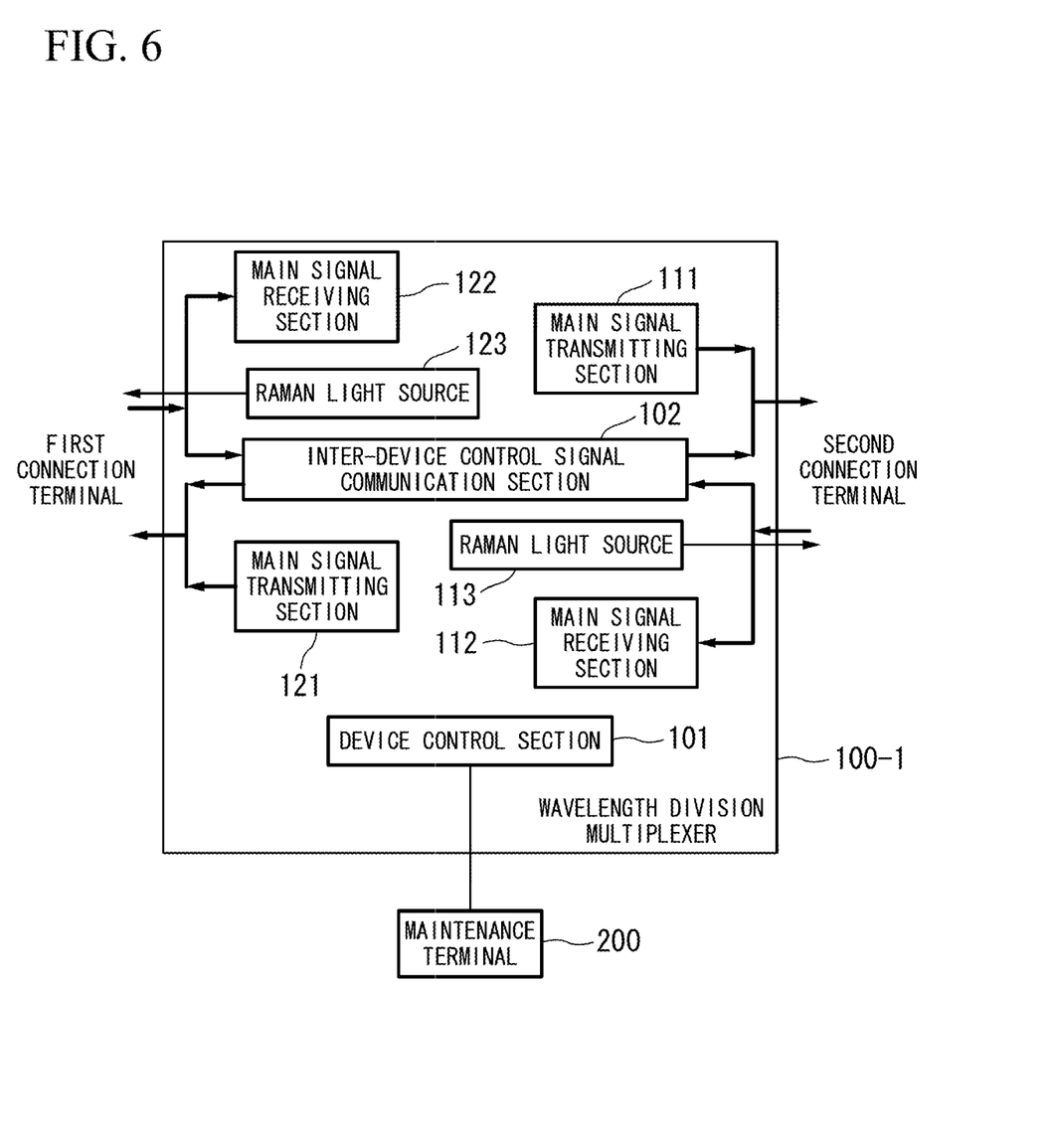
FIG. 6 is a schematic block diagram showing the structure of a wavelength division multiplexer according to the second embodiment.

FIG. 6 is a schematic block diagram showing the structure of a wavelength division multiplexer according to the second embodiment.

The wavelength division multiplexer 100-1 according to the second embodiment is further provided with Raman light sources 113 and 123 (excitation light output units) in addition to the processing sections provided in the wavelength division multiplexer 100-1 according to the first embodiment. Note that because the other processing sections are the same as those in the first embodiment, the same symbols are used in the description.

The Raman light sources 113 and 123 are connected to an optical fiber cable on the receiving side, and output excitation light in the opposite direction from received signals. As a result of excitation light being output, optical signals received by the main signal receiving sections 112 and 122 and by the inter-device control signal communication section 102 are amplified by Raman amplification.

A description of an operation to stop optical output in a maintenance segment of an optical communication system provided with a Raman light source will now be described. Here, an example is used in which the segment Z1 is taken as the maintenance segment, and a maintenance operator is located at the installation position of the wavelength division multiplexer 100-1.

Figure 7:
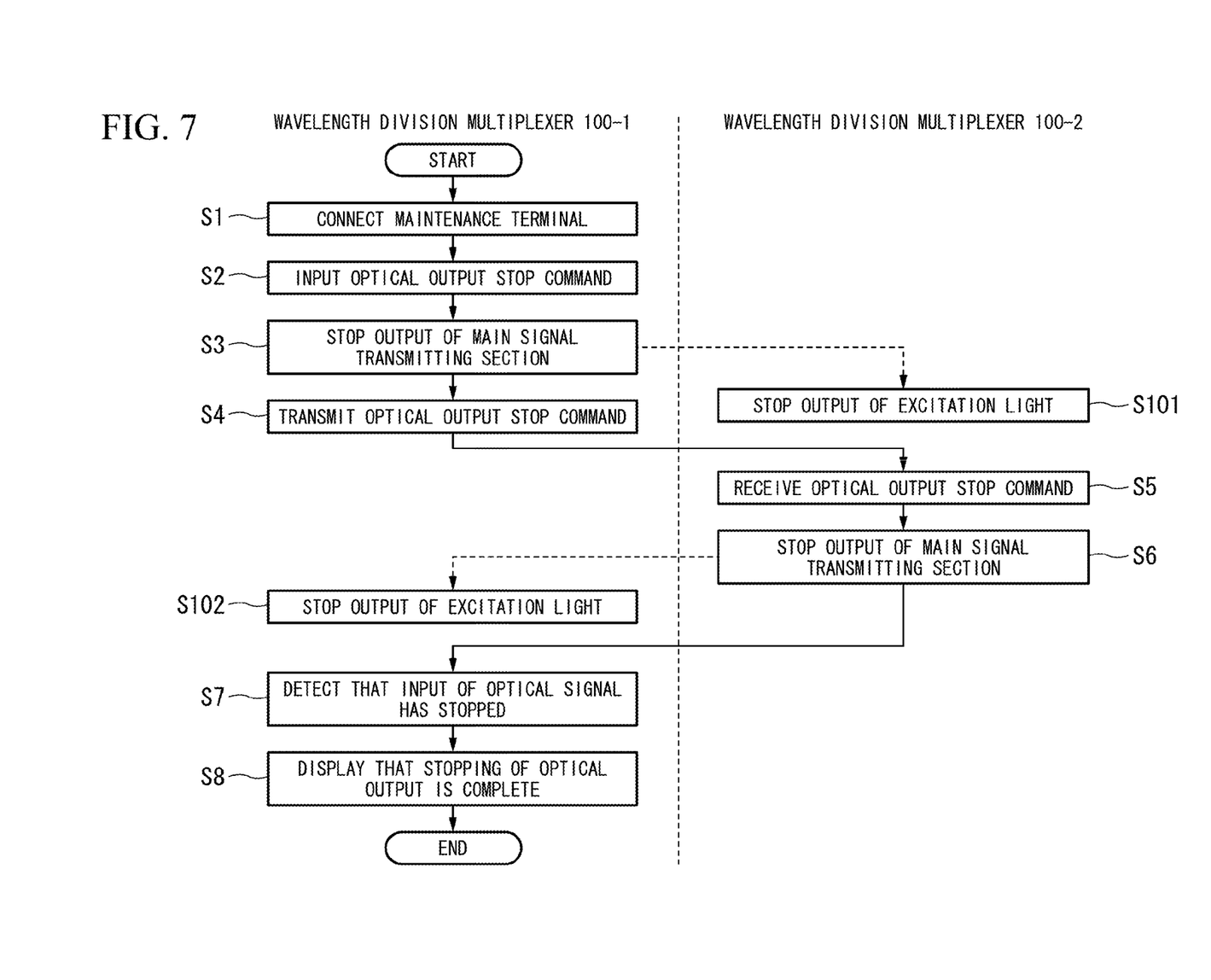
FIG. 7 is a flowchart showing an operation to stop an optical output in a segment Z1 in an optical communication system provided with Raman light sources.

FIG. 7 is a flow chart showing an operation to stop an optical output in the segment Z1 in an optical communication system provided with Raman light sources. Steps in which the same processing as in the first embodiment is performed are described using the same symbols.

Firstly, as a result of the maintenance operator connecting the maintenance terminal 200 to the wavelength division multiplexer 100-1, the device control section 101 of the wavelength division multiplexer 100-1 detects the connection of the maintenance terminal 200 (step S1). When the maintenance terminal 200 is connected, the maintenance operator inputs a command to stop the optical output from the second connection terminal of the wavelength division multiplexer 100-1 by operating an input section (not shown) of the maintenance terminal 200. When the maintenance terminal 200 receives the input of this optical output stop command, it outputs an optical output stop command for the second connection terminal to the device control section 101 of the wavelength division multiplexer 100-1 (step S2).

When the device control section 101 receives the input of the optical output stop command, it activates an APR function in the main signal transmitting section 111, and stops the optical output (step S3).

When the optical output from the main signal transmitting section 111 of the wavelength division multiplexer 100-1 has stopped, the main signal receiving section 122 of the wavelength division multiplexer 100-2 senses that the optical output from the wavelength division multiplexer 100-1 has stopped. When the device control section 101 (excitation light output stopping unit) senses that the optical output of the wavelength division multiplexer 100-1 has stopped, it stops the output of excitation light from the Raman light source 123 (step S101).

When the device control section 101 of the wavelength division multiplexer 100-1 acquires the optical output stop command in step S2, it transmits an optical output stop command to the wavelength division multiplexer 100-2 via the inter-device control signal communication section 102 (step S4).

The inter-device control signal communication section 102 of the wavelength division multiplexer 100-2 receives the optical output stop command which was sent in step S4 (step S5). The inter-device control signal communication section 102 of the wavelength division multiplexer 100-2 notifies the device control section 101 of the wavelength division multiplexer 100-2 about the received optical output stop command. The device control section 101 of the wavelength division multiplexer 100-2 acquires the optical output stop command from the inter-device control signal communication section 102. The device control section 101 activates an APR function in the main signal transmitting section 121 which is connected to the wavelength division multiplexer 100-1 which is the source of the optical output stop command transmission, and thus stops this optical output (step S6).

When the optical output from the main signal transmitting section 121 of the wavelength division multiplexer 100-2 has stopped, the main signal receiving section 112 of the wavelength division multiplexer 100-1 senses that the optical output from the wavelength division multiplexer 100-2 has stopped. When the device control section 101 senses that the optical output of the wavelength division multiplexer 100-2 has stopped, it stops the output of excitation light from the Raman light source 113 (step S102).

The inter-device control signal communication section 102 of the wavelength division multiplexer 100-1 detects the fact that the input of the optical signal from the wavelength division multiplexer 100-2 has stopped (step S7). When it detects that the input of the optical signal has stopped, the device control section 101 displays the fact that the stopping of the optical output in the segment Z1 has been completed on a display section (not shown) of the maintenance terminal 200 (step S8).

In this manner, as a result of the main signal receiving sections 112 and 122 sensing that the output of optical signals from the connected wavelength division multiplexers 100-1 through 100-3 has stopped, the wavelength division multiplexers 100-1 through 100-3 stop the excitation light from the Raman light sources 113 and 123. As a result of this, it is possible to stop excitation light after all of the optical signals transmitted from the connected wavelength division multiplexers 100-1 through 100-3 have been acquired.

Note that, here, an example is used in which the segment Z1 is taken as the maintenance segment, and the maintenance operator connects the maintenance terminal 200 to the wavelength division multiplexer 100-1, however, connecting the maintenance terminal 200 to the wavelength division multiplexer 100-2 and using the segments Z2 and Z3 as maintenance segments can be achieved by performing the same processing.

Note also that, here, an operation to stop an optical output is described, however, an operation to reduce an optical output can be achieved by performing the same processing. If an optical output is to be reduced, then the input control information is a command to reduce optical output instead of being a command to stop optical output. As a result of this, the wavelength division multiplexers 100-1 through 100-3 reduce the output level of optical signals to less than the output level which is used during normal operations.

Next, a description will be given of an operation to restart the optical output in the maintenance segment of the optical communication system provided with Raman light sources.

Here, as is described above, an example is described in which the segment Z1 is taken as the maintenance segment and a maintenance operator is located at the installation position of the wavelength division multiplexer 100-1.

Figure 8:
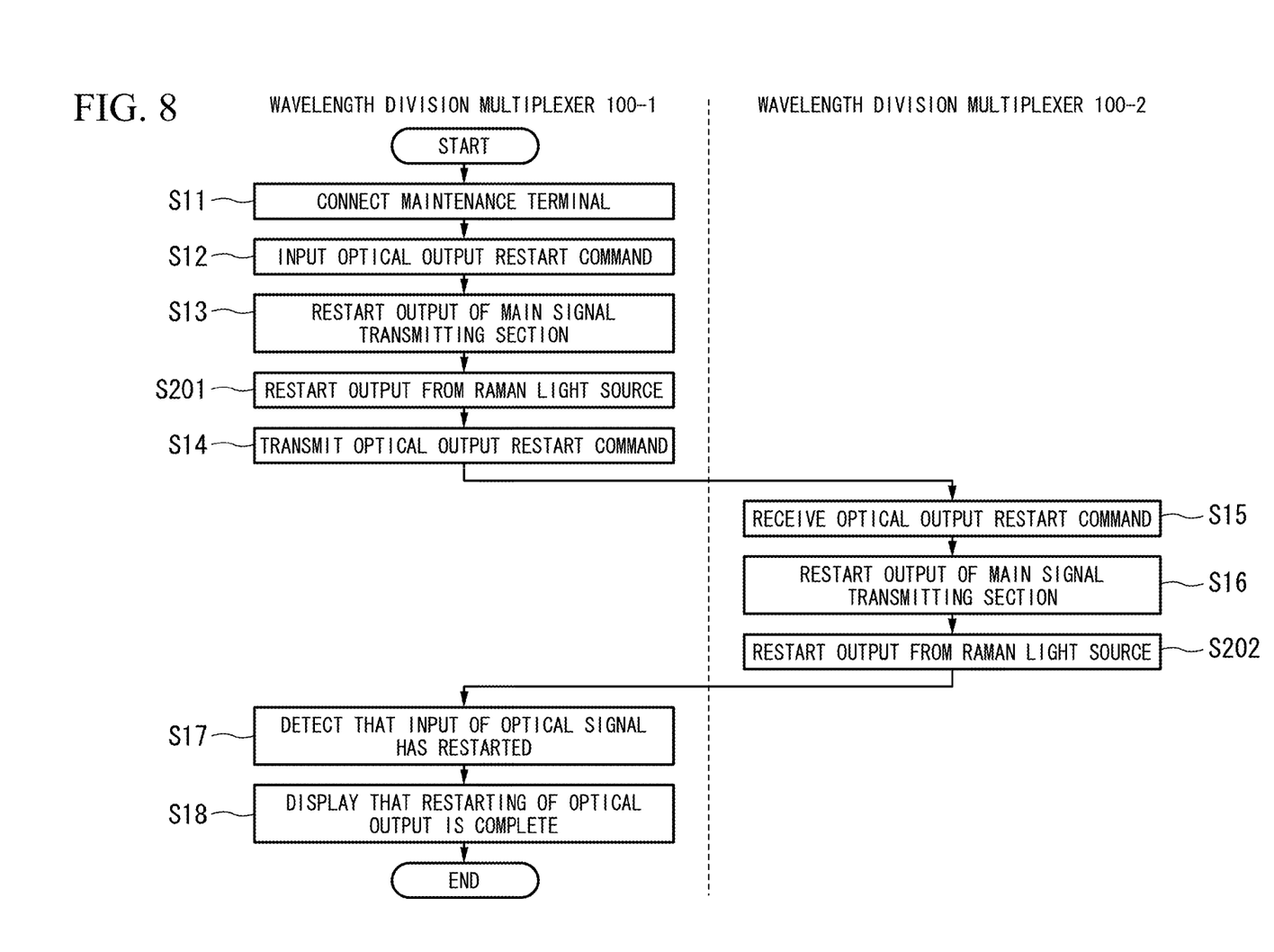
FIG. 8 is a flowchart showing an operation to restart an optical output in a segment Z1 in an optical communication system provided with Raman light sources.

FIG. 8 is a flowchart showing an operation to restart an optical output in the segment Z1 in an optical communication system provided with Raman light sources. Steps in which the same processing as in the first embodiment is performed are described using the same symbols.

Firstly, as a result of the maintenance operator connecting the maintenance terminal 200 to the wavelength division multiplexer 100-1, the device control section 101 of the wavelength division multiplexer 100-1 detects the connection of the maintenance terminal 200 (step S11). When the maintenance terminal 200 is connected, the maintenance operator operates the input section (not shown) of the maintenance terminal 200 so as to input a command to restart the optical output from the second connection terminal of the wavelength division multiplexer 100-1. When the maintenance terminal 200 receives the input of the optical output restart command, it outputs the optical output restart command for the second connection terminal to the device control section 101 of the wavelength division multiplexer 100-1 (step S12). When the device control section 101 receives the input of the optical output restart command, it activates an APR function in the main signal transmitting section 111, and thus restarts the optical output (step S13). When the device control section 101 (excitation light output restarting unit) acquires the optical output restart command, it causes the output of excitation light from the Raman light source 113 to be restarted (step S201). In addition, when the device control section 101 acquires the optical output restart command in step S12, it transmits the optical output restart command to the wavelength division multiplexer 100-2 via the inter-device control signal communication section 102 (step S14).

The inter-device control signal communication section 102 of the wavelength division multiplexer 100-2 receives the optical output restart command which was transmitted in step S14 (step S15). The inter-device control signal communication section 102 of the wavelength division multiplexer 100-2 notifies the device control section 101 of the wavelength division multiplexer 100-2 that it has received the optical output restart command. The device control section 101 of the wavelength division multiplexer 100-2 acquires the optical output restart command from the inter-device control signal communication section 102. The device control section 101 then activates an APR function in the main signal transmitting section 121 which is connected to the wavelength division multiplexer 100-1 which is the source of the optical output restart command transmission, and thus causes the optical output to be restarted (step S16). Moreover, when the device control section 101 acquires the optical output restart command, it causes the output of excitation light from the Raman light source 123 which is connected to the wavelength division multiplexer 100-1 which is the source of the optical output restart command transmission to be restarted (step S202).

The inter-device control signal communication section 102 of the wavelength division multiplexer 100-1 detects the fact that the input of the optical signal from the wavelength division multiplexer 100-2 has restarted (step S17). When it detects that the input of the optical signal has restarted, the device control section 101 displays the fact that the restarting of the optical output in the segment Z1 has been completed on a display section (not shown) of the maintenance terminal 200 (step S18).

In this manner, by restarting the outputs from the Raman light sources 113 and 123 by means of an optical output restart command, it is possible to restart operations of the optical communication system 1 which is provided with Raman light sources.

Note that, here, an example is used in which the segment Z1 is taken as the maintenance segment, and the maintenance operator connects the maintenance terminal 200 to the wavelength division multiplexer 100-1, however, connecting the maintenance terminal 200 to the wavelength division multiplexer 100-2 and using the segments Z2 and Z3 as maintenance segments can be achieved by performing the same processing.

In this manner, according to the second embodiment, in an optical communication system which is provided with Raman light sources, in addition to stopping or reducing a main signal optical output using the first embodiment, it is possible to stop or reduce the optical output of the Raman light sources. As a result, it is possible to easily perform the complex task of stopping or reducing a main signal optical output from a plurality of devices as well as optical outputs from Raman light sources.

Embodiments of this invention have been described above in detail with reference made to drawings, however, the specific structure of this invention is not limited to these embodiments and it is also possible to employ various design modifications and the like insofar as they do not depart from the spirit or scope of this invention.

For example, descriptions are given in these embodiments of cases in which the optical communication device is a wavelength division multiplexer, however, the present invention is not limited to this and the same effects can be obtained when the optical communication device is one that utilizes high output light such as, for example, an optical cross-connect device.

Note that, in these embodiments, a case is described in which the optical communication system has a ring structure, however, the present invention is not limited to this and the same effects can be obtained when the optical communication system has, for example, a mesh structure or a linear structure.

Note also that, in these embodiments, a case is described in which the optical communications system has a structure provided with three wavelength division multiplexers, however, the present invention is not limited to this and the same effects are obtained when the structure is provided with either two or four or more wavelength division multiplexers.

Note also that, in these embodiments, a case is described in which a maintenance terminal is connected to a wavelength division multiplexer and control signals are then transmitted, however, the present invention is not limited to this and it is also possible to employ a structure in which the wavelength division multiplexer is provided with an input section such as an optical output stop button or the like and no maintenance terminal is provided.

Note also that, in these embodiments, a case is described in which the wavelength division multiplexers are provided with an inter-device control signal communication section, however, the present invention is not limited to this and is also possible to employ a structure in which the same functions are provided in the main signal transmitting section and the main signal receiving section and no inter-device control signal communication section is provided in the wavelength division multiplexers. In this case, the same effects can be obtained as in these embodiments if, prior to an output from the main signal transmitting section being either stopped or reduced, the main signal transmitting section sends an optical output stop command or an optical output reduction command to the other wavelength division multiplexers that are connected to the maintenance segment.

According to the present invention, by inputting an optical output stop command or an optical output reduction command into one optical communication device in a maintenance segment, this optical communication device stops or reduces its own optical output from itself. Furthermore, it also sends the optical output stop command or optical output reduction command to optical communication devices in the maintenance segment which are connected to itself, thereby causing the optical output from these optical communication devices in the maintenance segment to be stopped or reduced. As a result, although, conventionally, it has been necessary to input a shutdown command to each one of a plurality of optical communication devices in a maintenance segment, because it is only necessary to input an optical output stop command or an optical output reduction command to a single optical communication device, there is no possibility that optical communication devices which should not be shut down will end up being shut down by mistake. Moreover, because it is possible to stop or reduce optical output by inputting an optical output stop command or an optical output reduction command, it is possible to stop or reduce the optical output in the maintenance segment irrespective of whether or not a fault has occurred.

It is apparent that the present invention is not limited to the above embodiments, but may be modified and changed without departing from the scope and spirit of the invention.

What is claimed is:

1. An optical communication device which transmits and receives optical signals via an optical fiber cable, comprising:
   a transmitting unit which transmits optical signals to another optical communication device;
   a receiving unit which receives optical signals from the other optical communication device;
   a command input unit which receives an input of either an optical output stop command or an optical output reduction command for the transmitting unit from the outside;
   a command transmitting unit which, when the optical output stop command is input, executes processing to transmit the optical output stop command to the other optical communication device via the transmitting unit, or when the optical output reduction command is input, executes processing to transmit the optical output reduction command to the other optical communication device via the transmitting unit;
   a command executing unit which, when the optical output stop command is input, executes processing to stop the output of optical signals from the transmitting unit, or when the optical output reduction command is input, executes processing to reduce the output level of optical signals from the transmitting unit to less than the output level used during normal operations; and
   a transition completion notification unit which, when an optical signal received by the receiving unit from the other optical communication device has stopped or when the input level of the optical signal has been reduced to less than the input level used during normal operations, outputs a maintenance state transition completion notification.

2. The optical communication device according to claim 1, wherein the command input unit receives the input of an optical output restart command for the transmitting unit from the outside,
   the command executing unit, when the optical output restart command is input, raises the output level of optical signals from the transmitting unit to the output level used during normal operations,
   the command transmitting unit, when the optical output restart command is input, transmits the optical output restart command to the other optical communication device via the transmitting unit, and
   the transition completion notification unit, when the input level of optical signals received by the receiving unit from the other optical communication device has been raised to the input level used during normal operations, outputs an operating state transition completion notification.

3. An optical communication device which transmits and receives optical signals via an optical fiber cable, comprising:
   a transmitting unit which transmits optical signals to another optical communication device;
   a receiving unit which receives an optical output stop command or an optical output reduction command from the other optical communication device; and
   a command executing unit which, when the optical output stop command is input, executes processing to stop the output of optical signals from the transmitting unit, or when the optical output reduction command is input, executes processing to reduce the output level of optical signals from the transmitting unit to less than the output level used during normal operations.

4. The optical communication device according to claim 3, wherein the receiving unit receives an optical output restart command from the other optical communication device, and
   the command executing unit, when the optical output restart command is input, raises the output level of optical signals from the transmitting unit to the output level used during normal operations.

5. The optical communication device according to claim 1, further comprising:
   an excitation light output unit which outputs excitation light which is used for Raman amplification via the optical fiber cable connected to the receiving unit; and
   an excitation light output stopping unit which, when an optical signal amplified by the excitation light is no longer being input, or when the input level of the optical signal has been reduced to less than the input level used during normal operations, stops the output of the excitation light output unit via the receiving unit.

6. The optical communication device according to claim 5, further comprising an excitation light output restarting unit which, when the optical output restart command is input, restarts the output of the excitation light by the excitation light output unit.

7. An optical communication system, comprising:
a first optical communication device and a second optical communication device which transmit and receive optical signals via an optical fiber cable,
wherein the first optical communication device comprises:
a transmitting unit which transmits optical signals to the second optical communication device;
a receiving unit which receives optical signals from the second optical communication device;
a command input unit which receives an input of either an optical output stop command or an optical output reduction command for its own transmitting unit from the outside;
a command transmitting unit which, when the optical output stop command is input, executes processing to transmit the optical output stop command to the second optical communication device via its own transmitting unit, or when the optical output reduction command is input, executes processing to transmit the optical output reduction command to the second optical communication device via its own transmitting unit;
a command executing unit which, when the optical output stop command is input, executes processing to stop the output of optical signals from its own transmitting unit, or when the optical output reduction command is input, executes processing to reduce the output level of optical signals from its own transmitting unit to less than the output level used during normal operations; and
a transition completion notification unit which, when an optical signal received by its own receiving unit from the second optical communication device has stopped or when the input level of the optical signal has been reduced to less than the input level used during normal operations, outputs a maintenance state transition completion notification, and
wherein the second optical communication device comprises:
a transmitting unit which transmits optical signals to the first optical communication device;
a receiving unit which receives an optical output stop command or an optical output reduction command from the first optical communication device; and
a command executing unit which, when the optical output stop command is input, executes processing to stop the output of optical signals from its own transmitting unit, or when the optical output reduction command is input, executes processing to reduce the output level of optical signals from its own transmitting unit to less than the output level used during normal operations.

8. The optical communication system according to claim 7, wherein the command input unit of the first optical communication device receives the input of an optical output restart command for its own transmitting unit from the outside,
the command executing unit of the first optical communication device, when the optical output restart command is input, raises the output level of optical signals from its own transmitting unit to the output level used during normal operations,
the command transmitting unit of the first optical communication device, when the optical output restart command is input, transmits the optical output restart command to the second optical communication device via its own transmitting unit,
the transition completion notification unit of the first optical communication device, when the input level of optical signals received by its own receiving unit from the second optical communication device has been raised to the input level used during normal operations, outputs an operating state transition completion notification,
the receiving unit of the second optical communication device receives an optical output restart command from the first optical communication device, and
the command executing unit of the second optical communication device, when the optical output restart command is input, raises the output level of optical signals from its own transmitting unit to the output level used during normal operations.

9. An optical output control method for an optical communication system which comprises a first optical communication device and a second optical communication device which transmit and receive optical signals via an optical fiber cable, comprising:
first transmitting in which a transmitting unit of the first optical communication device transmits optical signals to the second optical communication device;
first receiving in which a receiving unit of the first optical communication device receives optical signals from the second optical communication device;
command inputting in which a command input unit of the first optical communication device receives an input of either an optical output stop command or an optical output reduction command for its own transmitting unit from the outside;
command transmitting in which a command transmitting unit of the first optical communication device, when the optical output stop command is input, executes processing to transmit the optical output stop command to the second optical communication device via its own transmitting unit, or when the optical output reduction command is input, executes processing to transmit the optical output reduction command to the second optical communication device via its own transmitting unit;
first command executing in which a command executing unit of the first optical communication device, when the optical output stop command is input, executes processing to stop the output of optical signals from its own transmitting unit, or when the optical output reduction command is input, executes processing to reduce the output level of optical signals from its own transmitting unit to less than the output level used during normal operations;
transition completion notifying in which a transition completion notification unit of the first optical communication device, when an optical signal received by its own receiving unit from the second optical communication device has stopped or when the input level of the optical signal has been reduced to less than the input level used during normal operations, outputs a maintenance state transition completion notification;
second transmitting in which a transmitting unit of the second optical communication device transmits optical signals to the first optical communication device;
second receiving in which a receiving unit of the second optical communication device receives an optical output stop command or an optical output reduction command from the first optical communication device; and
second command executing in which a command executing unit of the second optical communication device, when the optical output stop command is input, executes processing to stop the output of optical signals from its own transmitting unit, or when the optical output reduction command is input, executes processing to reduce the output level of optical signals from its own transmitting unit to less than the output level used during normal operations.

10. The optical output control method according to claim 9, wherein the command input unit of the first optical communication device receives the input of an optical output restart command for its own transmitting unit from the outside, the command executing unit of the first optical communication device, when the optical output restart command is input, raises the output level of optical signals from its own transmitting unit to the output level used during normal operations, the command transmitting unit of the first optical communication device, when the optical output restart command is input, transmits the optical output restart command to the second optical communication device via its own transmitting unit, the transition completion notification unit of the first optical communication device, when the input level of optical signals received by its own receiving unit from the second optical communication device has been raised to the input level used during normal operations, outputs an operating state transition completion notification, the receiving unit of the second optical communication device receives an optical output restart command from the first optical communication device, and the command executing unit of the second optical communication device, when the optical output restart command is input, raises the output level of optical signals from its own transmitting unit to the output level used during normal operations.

11. A program carried on a non-transitory computer readable medium which causes a computer of an optical communication device which transmits optical signals via an optical fiber cable to function:

as a transmitting unit which transmits optical signals to another optical communication device;

as a command input unit which receives an input of either an optical output stop command or an optical output reduction command for the transmitting unit from the outside;

as a command transmitting unit which, when the optical output stop command is input, executes processing to transmit the optical output stop command to the other optical communication device via the transmitting unit, or when the optical output reduction command is input, executes processing to transmit the optical output reduction command to the other optical communication device via the transmitting unit;

as a command executing unit which, when the optical output stop command is input, executes processing to stop the output of optical signals from the transmitting unit, or when the optical output reduction command is input, executes processing to reduce the output level of optical signals from the transmitting unit to less than the output level used during normal operations; and as a transition completion notification unit which, when an optical signal received by the receiving unit from the other optical communication device has stopped or when the input level of the optical signal has been reduced to less than the input level used during normal operations, outputs a maintenance state transition completion notification.

12. The program carried on a non-transitory computer readable medium according to claim 11, which further causes the computer to function:

as a command input unit which receives the input of an optical output restart command for the transmitting unit from the outside;

as a command executing unit which, when the optical output restart command is input, raises the output level of optical signals from the transmitting unit to the output level used during normal operations;

as a command transmitting unit which, when the optical output restart command is input, transmits the optical output restart command via the transmitting unit; and as a transition completion notification unit which, when the input level of optical signals received by the receiving unit from the other optical communication device has been raised to the input level used during normal operations, outputs an operating state transition completion notification.

13. A program carried on a non-transitory computer readable medium which causes a computer of an optical communication device which transmits and receives optical signals via an optical fiber cable to function:

as a transmitting unit which transmits optical signals to another optical communication device;

as a receiving unit which receives an optical output stop command or an optical output reduction command from the other optical communication device; and as a command executing unit which, when the optical output stop command is input, executes processing to stop the output of optical signals from the transmitting unit, or when the optical output reduction command is input, executes processing to reduce the output level of optical signals from the transmitting unit to less than the output level used during normal operations.

14. The program carried on a non-transitory computer readable medium according to claim 13, which further causes the computer to function:

as a receiving unit which receives an optical output restart command via the optical fiber cable; and as a command executing unit which, when the optical output restart command is input, raises the output level of optical signals from the transmitting unit to the output level used during normal operations.

* * * * *